R. T. HAINES.
KINEMATOGRAPH MECHANISM.
APPLICATION FILED AUG. 25, 1906.
901,962.
Patented Oct. 27, 1908.
3 SHEETS—SHEET 1.
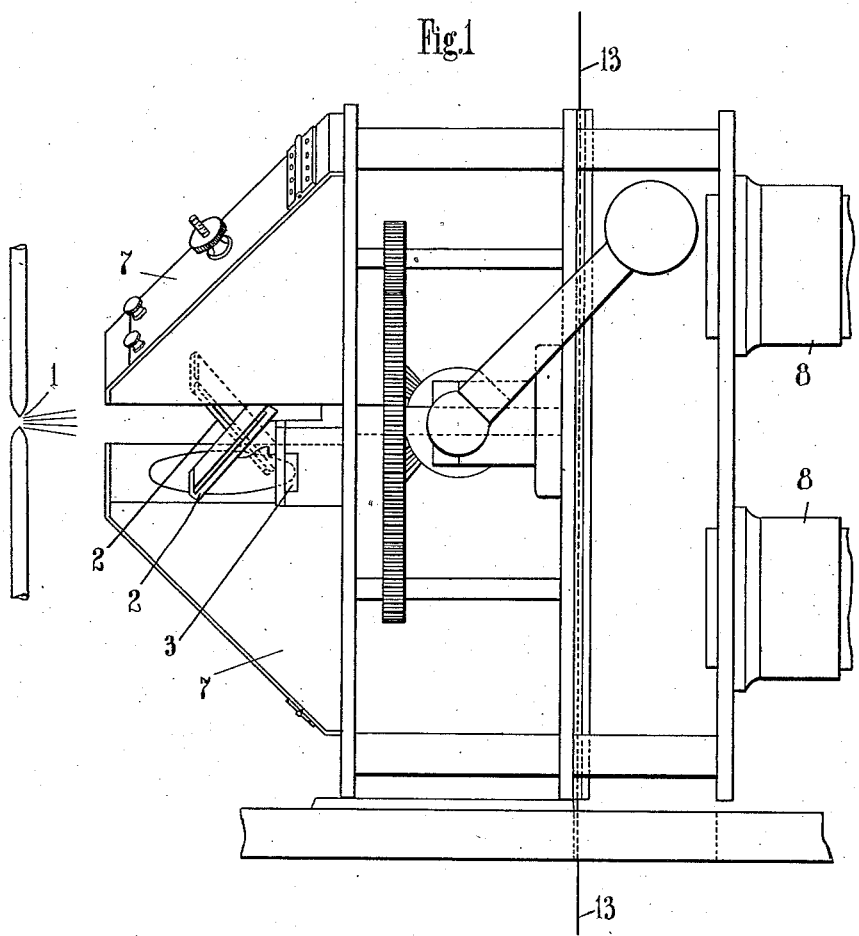

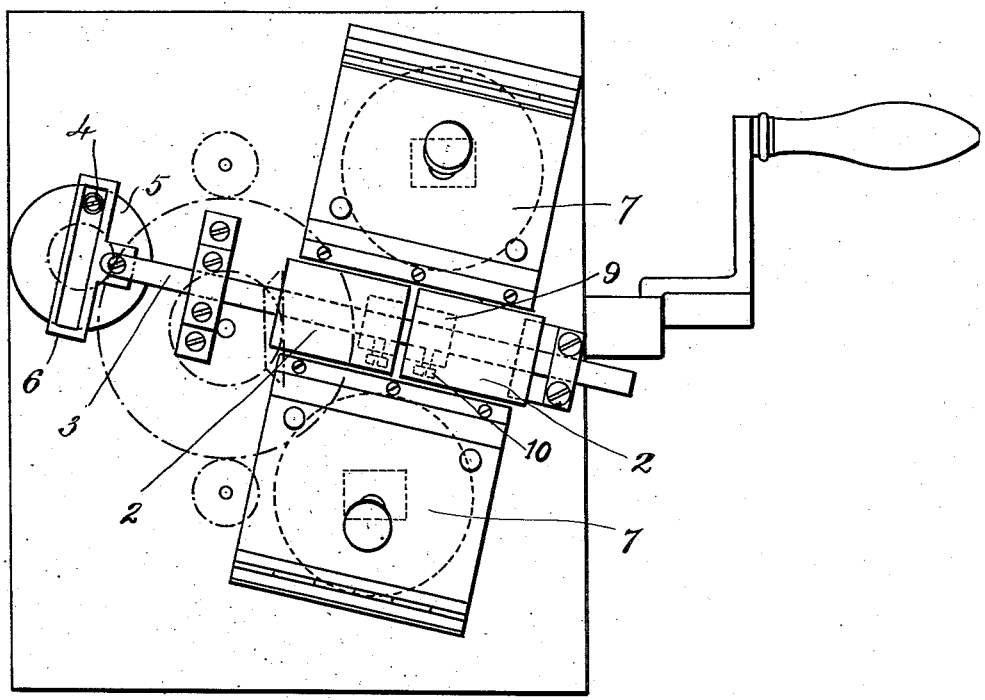

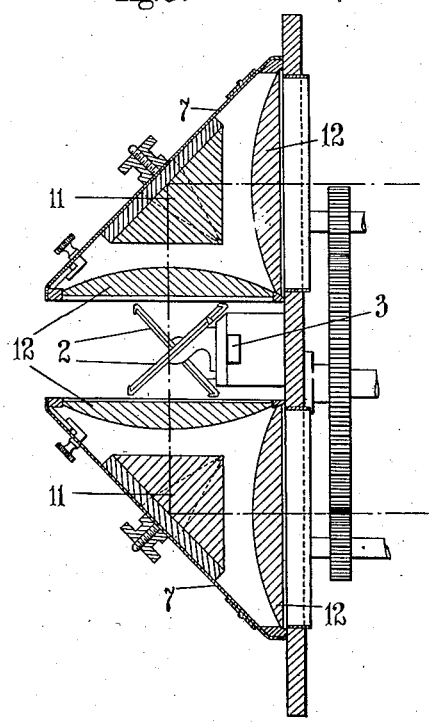

UNITED STATES PATENT OFFICE.

ROBERT THORN HAINES, OF LONDON, ENGLAND.

KINEMATOGRAPH MECHANISM.

No. 901,962.  Specification of Letters Patent.  Patented Oct. 27, 1908.

Application filed August 25, 1906. Serial No. 332,021.

*To all whom it may concern:*

Be it known that I, ROBERT THORN HAINES, a subject of the King of Great Britain, residing at 26 Osnaburgh street, London, England, have invented new and useful Improvements in or Relating to Kinematograph Mechanism, of which the following is a specification.

My invention relates to improvements in apparatus adapted for the reproduction of living pictures or animated scenes on a screen or the like.

The object of my invention is to enable one source of light to be used in duplex or multiplex projection; to dispense with the use of shutter mechanism altogether if desired, and to obtain a more perfect reproduction of living pictures or animated scenes upon a screen or any desired exhibiting surface by obviating the fluctuation of light, flickering and blurring, and by minimizing the vibration, unsteadiness, spots and other imperfections or irregularities.

According to my invention I may employ a duplex projecting system and a pair of projecting lenses, the images or pictures from which are thrown upon coincident positions upon the screen. I use one source of light, and provide mirrors and prisms so arranged that when the picture projected from one lens is fully illuminated or exposed the next picture in succession projected from the other lens is fully darkened or obscured, and when only a portion of one picture is illuminated the corresponding portion of the other picture is darkened and the remainder illuminated, so that the totals of the proportions of the pictures illuminated and thrown or projected on the screen by the lenses amount to but never exceed one complete picture, and throughout the whole operation there is a continuity of picture projected, and no decrease, obscuration or variation of light whatever, and at all times during the actual projection or exposure the film containing the projected or exposed pictures or the films or parts thereof containing the exposed picture, or the film or films or parts thereof containing the partly exposed picture, remains absolutely stationary and steady.

I do not confine myself to a duplex projecting system, as a triplex or multiplex system may, under certain circumstances, be found desirable, in which case the number of mirrors, prisms, condensers and lenses are correspondingly increased.

My invention is more particularly described with reference to the accompanying drawings, in which—

Figure 1 shows a side elevation of a duplex projecting apparatus. Fig. 2 shows a detail view of the reflecting mirrors and means for reciprocating the same across the source of light. Fig. 3 shows a section through the condensers and prisms.

Referring now to Fig. 1 of the drawings, I arrange a single source of light, 1, and at a suitable distance in front of said light I arrange a pair of mirrors, 2, one placed beside the other at right angles to the light and at right angles or some other suitable angle to each other. As shown in Fig. 2, the reflecting mirrors, 2, are mounted on a shaft, 3, which is moved backwards and forwards by means of the crank pin, 4, of the rotating disk, 5, working in the guide slot, 6, arranged at the end of said shaft, 3. At a suitable distance on each side of said mirrors I arrange a pair of prisms 11 and condensers, 12, in casings 7, said prisms 11 being adapted to receive the reflection of the light from said mirrors, 2, and to reflect it at right angles through the projector lenses, 8, in the ordinary way.

It will be readily understood that as the mirrors, 2, are moved backwards and forwards across the source of light, 1, the light comes gradually and alternately on one or the other mirror as the mirror moves in front thereof and throws the beam alternately upon one or the other prism, 7, so that the living picture on the screen is composed of a series of coincident projections as the light is alternately reflected by one or the other mirror through one or the other series of prisms, condensers, pictures and lenses, or partly through one series and partly through the other to the screen. The movement backwards and forwards of said duplex mirror enables me to maintain the continuous transmission of an entire image even during the period when the change is being made from one picture of a series on the film to the next picture of the other series, inasmuch as the portion not reflected through the one lens will be reflected through the other during the change and thus avoid the dark interval and absence of picture which cause the effect of flickering in the ordinary system of projection.

By the employment of a single source of light I am enabled to avoid the difference in illumination which is liable to occur when two lights are used, and which would be detrimental to the perfect representation of the pictures.

It will be obvious that my apparatus may be fitted to any well-known kinematograph mechanism, and I have not therefore described any special mechanism.

I employ a film or films 13 of pictures arranged in serial order, and produced in such a manner as to be adaptable to the particular projecting system which may be employed with my apparatus.

I prefer to use with the type of mechanism described only one positive film, on which I may print the odd numbers consecutively and the even numbers consecutively side by side the width of two pictures, commencing No. 2 picture a sufficient distance from No. 1 to leave a loop, or I may leave intervals between the odd numbered pictures and print the even numbered pictures in those intervals, commencing No. 2 picture a sufficient distance from No. 1 picture to enable a loop to be left in the film in order that each odd picture may be translated while each even picture remains stationary and is being projected, and vice versa.

If instead of one I use two positive films, I first obtain the full negative series on one negative film in the usual way, and print from it two positive films each containing the full series, or I print each alternate picture on each of such positive films, that is to say, if the pictures are numbered consecutively I print all the odd numbers on one positive film and all the even numbers on the other.

It should be understood that though I have used the term "mirror" throughout the specification I do not limit myself to a mirror alone, but any reflecting surface such as a prism can obviously be used with equal facility for reflecting the beam of light from the source of light to the prisms and condensers, and from thence to the projecting lenses.

I may arrange the lenses of the condensers combined and placed in front of the prism, or in any other desired position, instead of being separated and placed at opposite faces of the prism, as shown in Fig. 3 of the drawings.

Adjusting means must be provided to adjust the distance between the mirrors according to the distance of the light from said mirrors which varies according to the distance of the apparatus from the screen.

If the mirrors are too close to one another a white line is projected on to the picture while if too far apart a black line is projected. In order to allow of adjustment I mount each of said mirrors on the shaft 3 by means of a bracket 9 shown in dotted lines on Fig. 2, and in each of said brackets I arrange a set screw 10 adapted to be screwed down upon the shaft to hold the mirror in the desired position.

What I claim is:—

1. In a kinematograph apparatus the combination of a single source of light, a pair of reflecting mirrors set at an angle to each other, means for giving said mirrors a reciprocating movement across the light beam from said source of light and sets of prisms and condensers adapted to receive alternately and gradually the reflected beam from said mirrors and to effect the gradual exposure and obscuration of a series of pictures projected on to the screen.

2. In a kinematograph apparatus the combination of a single source of light, a pair of reflecting mirrors set at an angle to each other mounted on a shaft, a crank adapted to reciprocate said shaft, and sets of prisms and condensers adapted to receive alternately and gradually the reflected beam from said mirrors and to effect the gradual exposure and obscuration of a series of pictures projected on to the screen.

3. In a kinematograph apparatus the combination of a single source of light, a pair of reflecting mirrors set at an angle to each other, means for adjusting the distance between said mirrors, means for giving said mirrors a reciprocating movement across the light beam from said single source of light and sets of prisms and condensers arranged on each side of said mirrors adapted to receive alternately and gradually the reflected light beam from said mirrors and to effect the gradual exposure and obscuration of a series of pictures projected on to the screen.

4. In a kinematograph apparatus the combination of a single source of light, a pair of reflecting mirrors set at an angle to each other mounted on a shaft, a crank adapted to reciprocate said shaft, and sets of prisms and condensers arranged on each side of said mirrors adapted to receive alternately and gradually the reflected light beam from said mirrors and to effect the gradual exposure and obscuration of a series of pictures projected on to the screen.

In testimony whereof I have signed my name to this specification in the presence of two subscribing witnesses.

ROBERT THORN HAINES.

Witnesses:
ARTHUR J. STEPHENS,
LEONARD E. HAYNES.